United States Patent [19]

Terae

[11] Patent Number: 5,080,828
[45] Date of Patent: Jan. 14, 1992

[54] SILICONE EMULSION COMPOSITION

[75] Inventor: Nobuyuki Terae, Gunma, Japan

[73] Assignee: Shin-Etsu Chemical Co., Ltd., Tokyo, Japan

[21] Appl. No.: 357,953

[22] Filed: May 30, 1989

[30] Foreign Application Priority Data

May 30, 1988 [JP] Japan .................... 63-131938

[51] Int. Cl.$^5$ .................................... B01D 19/04
[52] U.S. Cl. ........................ 252/358; 252/321
[58] Field of Search ............ 252/321, 358, 312

[56] References Cited

U.S. PATENT DOCUMENTS

| | | | |
|---|---|---|---|
| 2,829,112 | 4/1958 | Solomon | 252/358 |
| 4,076,648 | 2/1978 | Rosen | 252/358 |
| 4,145,308 | 3/1979 | Simoneau et al. | 252/321 |
| 4,477,371 | 10/1984 | Huber et al. | 252/358 |
| 4,690,713 | 9/1987 | Terae et al. | 252/358 X |

OTHER PUBLICATIONS

McCutcheon's Detergents & Emulsifiers, 73 North America Edition, McCartcheon's Division, Allured Publ. Corp., NJ (1973), pp. 215-216.

*Primary Examiner*—Robert L. Stoll
*Assistant Examiner*—Daniel S. Metzmaier
*Attorney, Agent, or Firm*—Foley & Lardner

[57] ABSTRACT

A silicone emulsion composition, comprising:
(A) 100 parts by weight of a silicone oil compound essentially consisting of from 70 to 99% by weight of an organopolysiloxane and from 30 to 1% by weight of finely powdered silica; and
(B) from 3 to 40 parts by weight of a mixed emulsifying agent having an HLB of from 7.0 to 8.5, consisting of (B-1) from 50 to 75% by weight of a sorbitan fatty acid ester with an HLB of from 2.0 to 6.5, (B-2) from 5 to 40% by weight of polyoxyethylene sorbitan fatty acid ester with an HLB of from 6.0 to 16.0, and (B-3) from 5 to 30 parts by weight of a compound selected from the group consisting of a polyoxyethylene higher alcohol ether and a polyoxyethylene alkylphenol ether, each having an HLB of from 12.0 to 19.5. This emulsion has a low viscosity, good dilution property and good stability.

13 Claims, 1 Drawing Sheet

SILICONE EMULSION COMPOSITION

BACKGROUND OF THE INVENTION

1. Field of the Invention

This invention relates to a silicone emulsion composition, and more particularly to a silicone emulsion composition having a good dilution property and good stability, and useful as an anti-foaming agent and so forth.

2. Description of the Prior Art

Aqueous emulsions of silicone are widely used in various purposes as anti-foaming agents, foam stabilizers, release agents, water repellents and so forth, but in any instances the emulsions are required to be readily diluted with water, to be stable, and, in particular, to have a dilution stability.

In instances in which the silicone emulsions are used as anti-foaming agents, inorganic fine powders such as finely powdered silica are added to enhance anti-foaming properties. However, the addition of inorganic fine powders may sometimes result in an extremely worsened stability of emulsions. For example, the finely powdered silica may thicken silicon oil used, depending on content thereof, to cause creaming, or the finely powdered silica may be sedimented when emulsions are diluted. It is also known that heating the emulsions to 60° to 80° C. may destroy them, thus promoting the above phenomena such as creaming and sedimentation of finely powdered silica.

To improve the stability of silicone emulsions, a variety of emulsions have been proposed. There have been proposed, for example, a method in which a sucrose fatty acid ester, a sorbitan fatty acid ester and a glycerol fatty acid ester are used in combination [Japanese Patent Publication (KOKOKU) NO. 7335/1983], and a method in which a polyglycerol fatty acid ester is used in combination with a lipophilic emulsifying agent such as a sorbitan fatty acid ester or glycerol fatty acid ester [Japanese Unexamined Patent Publication (KOKAI) No. 262827/1985]. These, however, have been unsatisfactory in view of the stability and dilution property of the resulting silicone emulsion.

Shin-Etsu Chemical Co., Ltd. discloses in Japanese Unexamined Patent Publication (KOKAI) No. 277110/1987 than an emulsion comprising a lipophilic emulsifying agent with an HLB of from 8 to 20 and a lipophilic emulsifying agent with an HLB of from 2 to 7 which are mixed to have an HLB value of from 3 to 19 can effectively improve the stability and dilution property of silicone emulsions.

SUMMARY OF THE INVENTION

An object of this invention is to provide a silicone emulsion composition having a low viscosity and also having a good dilution property and good stability.

We made studies aiming at an improvement of the dilution property and stability of emulsions on the basis of the above silicone emulsion in which the two types of emulsions having different HLBs are used. As a result, we found that specific three types of emulsifying agents mixed in a specific proportion may be used as an emulsifying agent to improve the dilution property and stability of emulsions without an increase in the viscosity.

More specifically stated, this invention provides a silicone emulsion composition, comprising:

(A) 100 parts by weight of a silicon oil compound essentially consisting of from 70 to 99% by weight of an organopolysiloxane and from 30 to 1% by weight of finely powdered silica; and (B) from 3 to 40 parts by weight of a mixed emulsifying agent having an HLB of from 7.0 to 8.5, essentially consisting of (B-1) from 50 to 75% by weight of a sorbitan fatty acid ester with an HLB of from 2.0 to 6.5, (B-2) from 5 to 40% by weight of polyoxyethylene sorbitan fatty acid ester with an HLB of from 6.0 to 16.0, and (B-3) from 5 to 30 parts by weight of a compound selected from the group consisting of a polyoxyethylene higher alcohol ether and a polyoxyethylene alkylphenol ether, each having an HLB of from 12.0 to 19.5.

The silicone emulsion composition of this invention has a low viscosity, also has a good dilution property and stability, and yet can be stable at high temperatures. Hence, it can be stable for a long term, and may not cause creaming, oil flotage, sedimentation of inorganic fine powder, and so forth.

DETAILED DESCRIPTION OF THE PREFERRED EMBODIMENTS OF THE INVENTION

Figure 1:
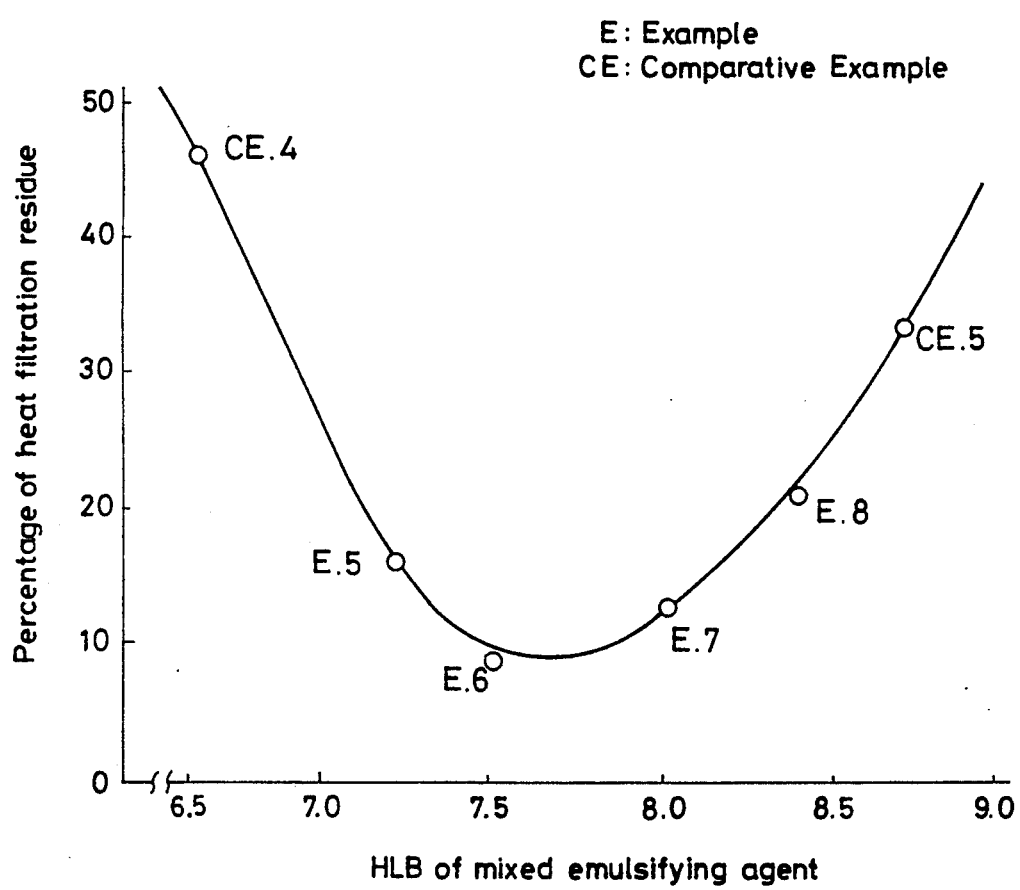
FIG. 1 is a graph to show the relationship between i) the percentage of heat filtration residues in 2% dilute solutions of silicone emulsions obtained in Examples 5 to 8 of this invention and Comparative Examples 4 an 5, and ii) the HLB of mixed emulsifying agents used in preparing said emulsions.

The component (A) silicone oil compound in the composition of this invention consists of an organopolysiloxane and a finely powdered silica. This organopolysiloxane includes, for example, compounds represented by the following formula:

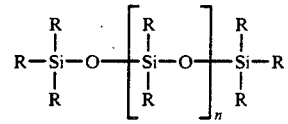

wherein R in plurality may be the same or different and each represent a substituted or unsubstituted hydrocarbon group, including, for example, a methyl group, an ethyl group, a phenyl group, a cyanomethyl group and a gamma-trifluoropropyl group and a part of R may represent a hydroxyl group; and n represents a positive integer, and usually an integer of 20 to 500.

This organopolysiloxane may typically include, for example, dimethylpolysiloxane, diethylpolysiloxane, methylpheylpolysiloxane, a polydimethylpolydiphenylsiloxane copolymer, and polymethyl-3,3,3,-trifluoropropylsiloxane. Of these, particularly advantageous in practical use is dimethylpolysiloxane terminated with a trimethylsilyl group or a dimethylhydroxysilyl group.

This organopolysiloxane may preferably have a viscosity at 25° C., of usually from 20 to 100,000 cSt, and more preferably from 50 to 10,000 cSt.

As the finely powdered silica, another component of the component (A), both dry silica and wet silica can be used, which are conventionally known as silica fillers. The finely powdered silica may include, for example, precipitated silica, silica xerogel, fumed silica, and treated silica obtained by treating the surfaces of any of these with a compound having an organic silyl group. More specifically it may include Aerosil (trademark;

available from Nippon Aerosil Co., Ltd.), Nipsil (trademark; available from Nippon Silica Industrial Co., Ltd.), Cab-O-Sil (trademark; available from Cabot Corp. U.S.A.), and Santocel (trademark; available from Monsanto Industrial Chemicals Co., U.S.A.). This finely powdered silica may preferably have a specific surface area of not less than 50 m²/g when measured according to the BET method.

The above organopolysiloxane and finely powdered silica in the component (A) are mixed in a proportion of from 70 to 99% by weight, and preferably from 85 to 97% by weight, for the organopolysiloxane, and from 1 to 30% by weight, and preferably from 3 to 15% by weight, for the finely powdered silica. With the amount of less than 1% by weight of the finely powdered silica, sufficient exhibition of its performance, for example, defoaming action in the case of anti-foaming agents, can not be achieved. With the amount of more than 30% by weight of the silica, an increase in the viscosity of the component (A) may occure to worsen workability, making the resulting emulsion difficult to handle.

The component (B), the mixed emulsifying agent, consists of the three types of emulsifying agent components of (B-1), (B-2) and (B-3) as described above.

The emulsifying agent component (B-1) sorbitan fatty acid ester has an HLB of from 2.0 to 6.5, and preferably from 3.0 to 5.5. With an HLB of less than 2.0 or more than 6.5, sufficient exhibition of the properties as a lipophilic emulsifying agent can not be achieved, because of the hydrophilic-lipophilic balance to other emulsifying agent components, and the resulting silicone emulsion composition is thereby unstable and tends to be thickened or separated. This sorbitan fatty acid ester has in its molecule 1 to 3 fatty acid residual group having 12 to 18 carbon atoms, as exemplified by lauric acid, myristic acid, palmitic acid, stearic acid and oleic acid. It specifically includes sorbitan monostearate, sorbitan monooleate, sorbitan tristerate, sorbitan sesquioleate, and sorbitan dipalmitate. These can be used alone or in combination of two or more. Of these, preferred are sorbitan monostearate, sorbitan monooleate, and sorbitan sesquioleate.

This component (B-1) is mixed in the component (B) in an amount of from 50 to 75% by weight, and preferably from 55 to 70% by weight. An amount of less than 50% by weight can not bring about sufficient exhibition of the proportions of this emulsifying agent component as a lipophilic emulsifying agent, making it difficult to emulsify the component (A) silicone oil compound. An amount of more than 75% by weight may result in an increase of the viscosity of the resulting silicone emulsion, causing solidification thereof.

The emulsifying agent component (B-2) polyoxyethylene sorbitan fatty acid ester has an HLB of from 6.0 to 16.0, and preferably from 7.0 to 15.0. An HLB of less than 6.0 can not bring about sufficient exhibition of its properties because of the hydrophilic-lipophilic balance to the component (B-1) which is a lipophilic emulsifying agent, and an HLB of more than 16.0 may result in an excessively strong hydrophilic nature to make the emulsion unstable. This polyoxyethylene sorbitan fatty acid ester is formed, for example, by addition polymerization of ethylene oxide to the above (B-1) sorbitan fatty acid ester. The addition number of the ethylene oxide may range usually from 1 to 30, and preferably from 5 to 20. This polyoxyethylene sorbitan fatty acid ester may include, for example, polyoxyethylene (6EO) sorbitan monostearate, polyoxyethylene (6EO) sorbitan monooleate, polyoxyethylene (20EO) sorbitan monopalmitate, polyoxyethylene (20EO) sorbitan monostearate, and polyoxyethylene (20EO) sorbitan tristearate (wherein, the underlined numerals in parentheses each indicate the number of the ethylene oxide unit; the same applies hereinafter).

This emulsifying agent component (B-2) is mixed in the component (B) in an amount of from 5 to 40% by weight, and preferably from 10 to 30% by weight. An amount of less than 5% by weight can not bring about sufficient exhibition of the properties of the emulsifying agent component (B-2) as a hydrophilic emulsifying agent, and an amount of more than 40% by weight may result in a poorness of the stability of the resulting silicone emulsion, tending to cause an increase in viscosity or layer separation.

The emulsifying agent component (B-3) polyoxyethylene higher alcohol ether or polyoxyethylene alkylphenol ether has an HLB of from 12.0 to 19.5, and preferably from 13.0 to 18.0. An HLB of less than 12.0 can not bring about sufficient exhibition of the properties as a hydrophilic emulsifying agent, particularly resulting in a weak action of decreasing the viscosity of the resulting silicone emulsion. An HLB of more than 19.5 makes the hydrophilic nature excessively strong, resulting in an unstable emulsion.

This component (B-3) polyoxyethylene higher alcohol ether may include, for example, compounds represented by the general formula: $RO(CH_2CH_2O)_nH$, wherein R is an alkyl group having 12 to 20 carbon atoms, and n is an integer that makes the HLB come to range from 12.0 to 19.5; which si formed by addition polymerization of ethylene oxide to a higher alcohol having 12 to 20 carbon atoms. It specifically includes, for example, those formed by addition polymerization of ethylene oxide to a higher alcohol selected from lauryl alcohol, cetyl alcohol, stearyl alcohol, oleyl alcohol and myristyl alcohol.

The polyoxyethylene alkylphenol ether includes, for example, compounds represented by the formula:

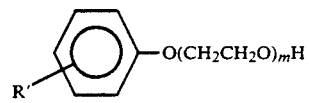

wherein $R^1$ is an alkyl group having 6 to 18 carbon atoms, and m is an integer that makes the HLB come to range from 12.0 to 19.5, which is formed by addition polymerization of ethylene oxide to an alkyl phenol having 6 to 18 carbon atoms. The alkyl group of the alkyl phenol moiety may include, for example, a hexyl group, an octyl group, a nonyl group, a decyl group, a dodecyl group, a tetradecyl group, a hexadecyl group and an octadecyl group.

The number of the ethylene oxide unit additionpolymerized in the emulsifying agent component (B-3) polyoxyethylene higher alcohol ether and/or polyoxyethylene alkylphenol ether is appropriately set so that the HLB of the emulsifying agent component (B-3) may be made to range from 12.0 to 19.5. The number of the unit may range usually from 5 to 40, and preferably from 10 to 30.

The polyoxyethylene higher alcohol ether or polyoxyethylene alkylphenol there may include, for example, polyoxyethylene(10EO) lauryl ether, polyoxyethylene(10EO) cetyl ether, polyoxyethylene(20EO) cetyl ether, polyoxyethylene(10EO) stearyl ether, polyoxyethylene(20EO) stearyl ether, polyoxyethylene (20EO) oeleyl ether, polyoxyethylene(15EO) octylphenyl ether, polyoxyethylene(30EO) octylphenyl ether, polyoxyethylene(10EO) nonylphenyl ether. polyoxyethylene(15EO) decylphenyl ether, polyoxyethylene(20EO) dodecylphenyl ether, polyoxyethylene(20EO) tetradecylphenyl ether, and polyoxyethylene(30EO) octadecylphenyl ether.

The above emulsifying agent component (B-3) is mixed in the component (B) in an amount of from 5 to 30% by weight, and preferably from 10 to 25% by weight. An amount of less than 5% by weight of the component (B-3) makes it difficult to bring about exhibition of the properties as a hydrophilic emulsifying agent, particularly making it impossible to improve the dilution property of the emulsion because of a decrease in viscosity. An amount of more than 30% by weight may result in a poor stability of the resulting emulsion, tending to cause layer separation.

The component (B) mixed emulsifying agent of the composition of this invention can be obtained by mixing the three types of emulsifying agent components (B-1), (B-2) and (B-3) in given proportions. This mixed emulsifying agent has an HLB of from 7.0 to 8.5, and preferably from 7.5 to 8.5. An HLB which is either less than 7.0 or more than 8.5 makes poor the stability after dilution when the resulting silicone emulsion is diluted with water, and may result in destruction of emulsions particularly when heated to 60° to 80° C., making serious the phenomena such as creaming and oil flotage.

Herein, the HLB after the mixing (or HLBm) of the plural emulsifying agents can be calculated by the following formula:

$$HLB_m = \frac{(W_1 \times HLB_1) + (W_2 \times HLB_2) + (W_3 \times HLB_3)}{W_1 + W_2 + W_3}$$

wherein;
$W_1$: Weight percentage of the emulsifying agent (B-1)
$W_2$: Weight percentage of the emulsifying agent (B-2)
$W_3$: Weight percentage of the emulsifying agent (B-3)
$HLB_1$: HLB of the emulsifying agent (B-1)
$HLB_2$: HLB of the emulsifying agent (B-2)
$HLB_3$: HLB of the emulsifying agent (B-3)

The composition of this invention comprises the above component (A) and from 3 to 40 parts by weight of the component (B) per 100 parts by weight of said component (A), which are mixed and emulsified in water. If the amount of the component (B) is less than 3 parts by weight based on 100 parts by weight of the component (A), it may be difficult to carry out emulsification, and it may be impossible to obtain a stable emulsion. If the amount of the component (B) is more than 40 parts by weight, the resulting emulsion is stable, but may have a high viscosity and also have poor properties inherent in silicones, such as deforming property, due to the fact that the silicone component is covered with the emulsifying agents.

The composition of this invention can be prepared by adding a given amount of the component (B) mixed emulsifying agent in the component (A), and, while slowly adding water necessary for forming a O/W emulsion, for example, 20 parts by weight of water, in the resulting mixture, carrying out emulsification using an emulsifying dispersion machine such as a homomixer, a colloid mill or a homogenizer. Water may further be optionally added in order to obtain an emulsion with the desired concentration.

In the composition of this invention, suitable additives may further be optionally added in forming emulsions to improve the stability of the emulsions. Such additives may include, for examples, thickening agents, dispersing agents, starches as protective colloid agents; water-soluble naturally occurring polymeric compounds such as gum arabic, sodium alginate, casein, agar, guar gum, gelatin, dextrin, sodium pectate, and locust-bean gum; semi-synthetic polymeric compounds such as methyl cellulose, crystalline cellulose, ethyl cellulose, carboxymethyl cellulose, hydroxyethyl cellulose, and propylene glycol alginate; polyvinyl alcohol, sodium polyacrylate, a carboxyvinyl polymer, a methoxyethylene maleic anhydride copolymer; as well as polypropylene glycol, polyethylene glycol, and a polypropylene glycol-polyethylene glycol block copolymer, which are used as emulsifying auxiliaries or emulsion stabilizers in carrying out emulsification.

The composition of this invention can be used as anti-forming agents used in dyeing, scouring and sizing processes in the textile industries, and processes in preparing and working latexes, rubbers, adhesives, etc. Other purposes that the anti-foaming agents, include release agents, in molding rubbers, plastics or castings, release agents in molding tires, water repellents or softening agents for soft goods (or textiles), cosmetics such as hair cream, car waxes and lustering agents for tires and pianos.

EXAMPLES

This invention will be described below in greater detail by way of Examples and Comparative Examples. In the following examples, "parts" indicates "parts by weight".

EXAMPLE 1 TO 4, COMPARATIVE EXAMPLES 1 TO 3

Oil compounds, the component (A), were each prepared by mixing 92 parts of dimethylpolysiloxane (trade name: KF-96; available from Shin-Etsu Chemical Co., Ltd.; viscosity at 25° C.: 1,000 cSt) and 8 parts of finely powdered silica (trade name: Nipsil-LP; available from Nippon Silica Industrial Co., Ltd.), and mixed emulsifying agents, the component (B), having the composition as shown in Table 1 were further respectively added with the formulation as shown in Table 1, followed by heating and mixing at 60° to 70° C. for 1 hour with stirring. While slowly adding 60 parts of water at temperatures of 20° to 30° C. in 40 parts by weight each of the resulting silicone emulsion compositions, stirring and mixing were carried out using a homomixer until the compositions became uniform, thus obtaining silicone emulsions.

Separation stability, stability and viscosity of dilute solutions, and average diameter of emulsion particles were measured on the resulting silicone emulsions according to the following methods. Results obtained are shown in Table 1. In Table 1, "POE" denotes a polyoxyethylene group, and the numerals in parentheses denote the number of ethylene oxide unit polymerized in POE. The same applies also in Table 2.

Separation Stability of Emulsions

Silicone emulsions were each put in a 250 ml glass bottle having a stopper. The bottle was hermetically stoppered, and thereafter allowed to stand in a thermostatic chamber kept at 40° C. to observe changes with time of the emulsions. Results were evaluated according to the following criterions.
A: No changes for 30 days or more.
B. Separation occurred in 30 days.
C. Separation occurred in 15 days.

Stability of Dilute Solutions of Emulsions (Dispersibility)

In a beaker having a volume of 300 ml, 4 g of a silicone emulsion and 196 g of water were put, and the contents were stirred for 3 minutes using a magnetic stirrer. The state of dispersion was observed after it was allowed to stand for 10 minutes. Results were evaluated according to the following criterions.
A: Uniformly dispersed.
B. Oil separated a little on the surface.
C. Oil considerably separated on the surface.
(Heat stability)

Next, the emulsion was kept in the beaker, and, in that state, heated at 130° C. for 30 minutes in a pressure sterilizer, thereafter taken out therefrom, and cooled to room temperature, and the state of the emulsion was observed. Evaluation was made according to the following criterions.
A: Uniform emulsion.
B: Emulsion destroyed in part.
C: Emulsion completely destroyed.

The silicone emulsion was further filtered using cotton cloth, and gel-like undesirably demulsified products remaining in the cotton cloth and beaker were weighed. The weight measured was divided by the weight of solid contents of the emulsion initially charged, to determine the percentage of heat filtration residues.

Viscosity of Emulsions

A silicone emulsion was put in a glass bottle having a volume of 250 ml, which was allowed to stand for 24 hours in a thermostat chamber kept at 25° C., and thereafter the viscosity of the emulsion was measured using a BM-type rotaviscometer under a revolution number of 12 rpm.

Average Diameter of Emulsion Particles

Using a particle size distribution measuring apparatus manufactured by Coulter Electronics Co., U.S.A. (Coulter Counter, Model $T_A$-II), volume average particle diameter of emulsion particles was measured.

EXAMPLES 5 TO 8, COMPARATIVE EXAMPLES 4 AND 5

Example 1 was repeated to obtain silicone emulsions, except that in each example the oil compound, the component (A), was prepared by mixing 90 parts of dimethylpolysiloxane (trade name: KF-96; available from Shin-Etsu Chemical Co., Ltd.; viscosity at 25° C.: 1,000 cSt), 10 parts of finely powdered silica (trade name: Aerosil R-972; available from Nippon Aerosil Co., Ltd.) surface-treated with dimethylchlorosilane and 2 parts of polypropylene glycol (molecular weight: 2,000) as an emulsifying auxiliary, and the component (B) was added therein with the formulation as shown in Table 2, followed by addition of 63 parts of water based on 37 parts of the resulting silicone emulsion composition. Separation stability, stability and viscosity of dilute solutions, and average diameter of emulsion particles were measured in the same manner as in Examples 1 to 4. Results obtained are shown in Table 2. The percentage of heat filtration residues in 2% dilute solutions of emulsions was allotted as ordinate, and the HLB of the mixed emulsifying agents used, as abscissa, to give a graphical representation as shown in FIG. 1.

TABLE 1

|  |  | Example |  |  |  | Comparative Ex. |  |  |
|---|---|---|---|---|---|---|---|---|
|  |  | 1 | 2 | 3 | 4 | 1 | 2 | 3 |
| (A) Silicone oil compound: (parts) |  | 30 | 30 | 30 | 30 | 30 | 30 | 30 |
| (B) Mixed emulsifying agent: | HLB |  |  |  |  |  |  |  |
| (B-1) |  |  |  |  |  |  |  |  |
| Sorbitan tristearate | 2.1 |  |  |  | 6.0 |  |  | 6.0 |
| Sorbitan monooleate | 4.3 | 6.0 |  |  |  |  |  |  |
| Sorbitan monostearate | 4.7 |  | 7.0 | 7.0 |  |  | 6.0 |  |
| Sorbitan monolaurate | 8.6 |  |  |  |  | 8.0 |  |  |
| (B-2) |  |  |  |  |  |  |  |  |
| POE*(6) sorbitan monostearate | 9.6 | 2.0 |  |  |  |  |  |  |
| POE(20) sorbitan tristearate | 10.5 |  | 1.0 |  |  |  |  |  |
| POE(20) sorbitan monostearate | 14.9 |  |  | 1.0 |  |  |  | 2.0 |
| POE(20) sorbitan monooleate | 15.0 |  |  |  | 2.0 |  |  |  |
| POE(20) sorbitan monolaurate | 16.9 |  |  |  |  |  | 2.0 |  |
| (B-3) |  |  |  |  |  |  |  |  |
| POE(7) oleyl ether | 10.5 |  |  |  |  |  |  | 2.0 |
| POE(10) oleyl ether | 14.0 |  |  | 2.0 |  |  |  |  |
| POE(20) cetyl ether | 17.0 | 2.0 |  |  |  | 2.0 |  |  |
| POE(15) nonylphenyl ether | 18.0 |  | 2.0 |  |  |  | 2.0 |  |
| POE(30) octylphenyl ether | 17.0 |  |  |  | 2.0 |  |  |  |
| HLB of mixed emulsifying agent |  | 7.9 | 7.9 | 7.6 | 7.7 | 10.3 | 9.8 | 6.3 |
| Results of measurement: |  |  |  |  |  |  |  |  |
| Separation stability of emulsion |  | A | A | A | A | C | C | B |
| Dilution stability of emulsion |  |  |  |  |  |  |  |  |
| Dispersibility |  | A | A | A | A | C | B | C |
| Heat stability |  | A | A | A | A | C | C | C |
| Heat filtration residues (%) |  | 6.4 | 8.0 | 4.2 | 5.6 | 33.4 | 28.4 | 22.6 |
| Viscosity of emulsion at 25° C. (cP) |  | 80 | 60 | 100 | 80 | 20 | 40 | 5800 |
| Av. particle diam. of emul. particles (μm) |  | 10.2 | 11.1 | 12.1 | 11.4 | 9.4 | 7.3 | 13.4 |

TABLE 2

|  | Example | | | | Comparative Ex. | |
| --- | --- | --- | --- | --- | --- | --- |
|  | 5 | 6 | 7 | 8 | 4 | 5 |
| (A) Silicone oil compound: (parts) | 30 | 30 | 30 | 30 | 30 | 30 |
| (B) Mixed emulsifying agent: | | | | | | |
| (B-1) Sorbitan monostearate | 5.0 | 4.5 | 4.5 | 4.0 | 5.0 | 3.5 |
| (B-2) POE*(6) sorbitan monostearate | 1.0 | 1.5 | 1.0 | 1.5 | 1.5 | 2.0 |
| (B-3) POE(30) octylphenyl ether | 1.0 | 1.0 | 1.5 | 1.5 | 0.5 | 1.5 |
| HLB of mixed emulsifying agent | 7.2 | 7.5 | 8.0 | 8.4 | 6.6 | 8.7 |
| Results of measurement: | | | | | | |
| Separation stability of emulsion | A | A | A | A | A | C |
| Dilution stability of emulsion | | | | | | |
| Dispersibility | A | A | A | A | C | C |
| Heat stability | A | A | A | B | C | C |
| Heat filtration residues (%) | 15.6 | 8.2 | 12.0 | 20.8 | 45.9 | 33.8 |
| Viscosity of emulsion at 25° C. (cP) | 800 | 200 | 70 | 50 | 9300 | 20 |
| Av. particle diam. of emul. particles (μm) | 12.6 | 10.5 | 11.2 | 11.7 | 7.6 | 16.3 |

We claim:

1. A silicone emulsion composition, comprising:
   (A) 100 parts by weight of a silicone oil compound consisting essentially of from 70 to 99% by weight of an organopolysiloxane and from 30 to 1% by weight of finely powdered silica; and
   (B) from 3 to 40 parts by weight of a mixed emulsifying agent having an HLB of from 7.0 to 8.5, consisting of
      (B-1) from 50 to 75% by weight of a sorbitan fatty acid ester with an HLB of from 2.0 to 6.5,
      (B-2) from 5 to 40% by weight of polyoxyethylene sorbitan fatty acid ester with an HLB of from 6.0 to 16.0, and
      (B-3) from 5 to 30% by weight of a compound selected from the group consisting of a polyoxyethylene higher alcohol ether and a polyoxyethylene alkylphenol ether, each having an HLB of from 12.0 to 19.5, wherein said component (B-3) is selected from the group consisting of a polyoxyethylene higher alcohol ether having from 10 to 30 ethylene oxide units and a polyoxyethylene alkylphenol ether having from 10 to 30 ethylene oxide units.

2. The silicone emulsion composition according to claim 1, wherein said organopolysiloxane in the component (A) is a dimethylpolysiloxane terminated with trimethylsilyl groups or dimethylhydroxysilyl groups at both its ends.

3. The silicone emulsion composition according to claim 1, wherein said organopolysiloxane in the component (A) has a viscosity of from 20 to 100,000 cSt at 25° C.

4. The silicone emulsion composition according to claim 1, wherein said finely powdered silica in the component (A) has a specific surface area of not less than 50 $m^2/g$ when measured according to the BET method.

5. The silicone emulsion composition according to claim 1, wherein said component (A) consists of from 85 to 97% by weight of the organopolysiloxane and from 3 to 15% by weight of the finely powdered silica.

6. The silicone emulsion composition according to claim 1, wherein said component (B-1) ester has an HLB of from 3.0 to 5.5; said component (B-2) ester an HLB of from 7.0 to 15.0; and said component (B-3) compound an HLB of from 13.0 to 18.0.

7. The silicone emulsion composition according to claim 1, wherein said component (B-1) ester is selected from the group consisting of sorbitan monostearate, sorbitan monooleate, and sorbitan sesquioleate.

8. The silicone emulsion composition according to claim 1, wherein said component (B-2) ester has a polyoxyethylene chain with 1 to 30 ethylene oxide units.

9. The silicone emulsion composition according to claim 8, wherein said component (B-2) ester has a polyoxyethylene chain with 5 to 20 ethylene oxide units.

10. The silicone emulsion composition according to claim 1, wherein said compound (B-3) component is a polyoxyethylene higher alcohol ether represented by the general formula:

$$RO(CH_2CH_2O)_nH$$

wherein R is an alkyl group having 12 to 20 carbon atoms, and n is an integer that makes the HLB come to range from 12.0 to 19.5.

11. The silicone emulsion composition according to claim 1, wherein said component (B-3) compound is a polyoxyethylene alkylphenol ether represented by the formula:

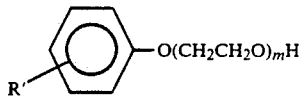

wherein $R^1$ is an alkyl group having 6 to 18 carbon atoms, and m is an integer that makes the HLB come to range from 12.0 to 19.5.

12. The silicone emulsion composition according to claim 1, wherein said component (B) consists of from 55 to 70% by weight of said component (B-1) ester, from 10 to 30% by weight of said component (B-2) ester and from 10 to 25% by weight of said component (B-3) compound.

13. The silicone emulsion composition according to claim 1, wherein said component (B) mixed emulsifying agent has an HLB of from 7.5 to 8.5.

* * * * *